(12) United States Patent
Headley et al.

(10) Patent No.: US 8,317,166 B2
(45) Date of Patent: Nov. 27, 2012

(54) LIQUID COLLECTION AND DISTRIBUTION DEVICE FOR MASS TRANSFER COLUMN AND PROCESS INVOLVING SAME

(75) Inventors: Darran Matthew Headley, Valley Center, KS (US); David Ray Ewy, Goddard, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 13/280,609

(22) Filed: Oct. 25, 2011

(65) Prior Publication Data

US 2012/0111717 A1    May 10, 2012

Related U.S. Application Data

(60) Provisional application No. 61/412,277, filed on Nov. 10, 2010.

(51) Int. Cl.
*B01F 3/04* (2006.01)
(52) U.S. Cl. .......................................... 261/97
(58) Field of Classification Search .................... 261/97, 261/110
See application file for complete search history.

(56) References Cited

U.S. PATENT DOCUMENTS

| | | | |
|---|---|---|---|
| 4,689,183 A | | 8/1987 | Helms et al. |
| 4,744,929 A | * | 5/1988 | Robinson et al. ............... 261/97 |
| 5,645,770 A | | 7/1997 | McNulty et al. |
| 5,897,748 A | * | 4/1999 | Kaibel ............................. 203/1 |
| 6,749,182 B1 | * | 6/2004 | Larson et al. .................... 261/97 |
| 7,007,932 B2 | * | 3/2006 | Armstrong et al. ............. 261/97 |
| 7,114,709 B2 | | 10/2006 | Ender et al. |
| 7,125,004 B2 | * | 10/2006 | Dollie et al. .................... 261/97 |
| 2002/0079597 A1 | * | 6/2002 | Bartlok ........................... 261/97 |
| 2007/0069405 A1 | * | 3/2007 | Dubettier-Grenier .......... 261/97 |

FOREIGN PATENT DOCUMENTS

JP            09-075602 A        3/1997

OTHER PUBLICATIONS

Notification of Transmittal of the International Search Report and the Written Opinion of the International Searching Authority, or the Declaration dated May 7, 2012, in corresponding International Patent Application No. PCT/US2011/057818; International filing date: Oct. 26, 2011; Applicant: Koch-Glitsch, LP.

* cited by examiner

*Primary Examiner* — Charles Bushey
(74) *Attorney, Agent, or Firm* — Hovey Williams LLP

(57) ABSTRACT

A liquid collection and distribution device is provided to support a bed of packing material and to collect liquid exiting the bed and redistribute it to an underlying bed of packing material with improved compositional and volumetric flow uniformity. The liquid collection and distribution device includes a liquid collector, a liquid distributor, and a lattice-type framework positioned between and supporting the liquid collector and the liquid distributor. In addition to supporting the liquid collector and liquid distributor, the framework has internal fluid passages that convey the liquid from the liquid collector to the liquid distributor while shielding the liquid from ascend vapor or gas flow.

20 Claims, 11 Drawing Sheets

LIQUID COLLECTION AND DISTRIBUTION DEVICE FOR MASS TRANSFER COLUMN AND PROCESS INVOLVING SAME

BACKGROUND OF THE INVENTION

The present invention relates generally to apparatus and methods for supporting vapor-liquid contact devices such as structured packing in columns in which mass transfer and/or heat exchange processes occur and to apparatus and methods for collecting liquid after it exits the vapor-liquid contact devices and redistributing it to other vapor-liquid contact devices.

Random and structured packing elements are used in mass transfer or heat exchange columns to facilitate contact between fluid streams flowing within the column. The packing elements generally improve the mass transfer or heat exchange by providing surfaces onto which the fluid streams are able to spread to increase the area of contact between the ascending and descending fluid streams. The packing elements are generally arranged in a bed which fills the cross section of the column and has a preselected depth or height.

Horizontally-extending supports, typically referred to as support plates, are used to support the bed of packing elements within the column. The support plates must have a high percentage of open area to minimize any restriction to the countercurrent flow of rising vapor and descending liquid. A variety of support plate configurations are used, such as open grid type structures commonly used to support structured packings and corrugated structures used with random packings. The support plates are typically supported by a support ring fixed to an inner surface of the shell of the column and, in larger diameter columns, liquid collection and distribution devices in the form of beams or trusses span the column cross section at one or more spaced-apart locations to provide additional support for the support plates.

In columns with multiple beds of packing elements, liquid exiting one bed is normally collected and redistributed to an underlying bed. This collection and redistribution of the liquid is necessary to correct any liquid flow irregularities present in the liquid exiting from each packing bed before that liquid is introduced into an underlying packing bed. These liquid flow irregularities are generally undesirable because they impede the desired uniform vapor-liquid interaction within the packing bed. Normally, a liquid collector plate is positioned under the overlying packing bed to collect the exiting liquid and feed it to a liquid distributor which is spaced below the collector plate and above the underlying packing bed. The liquid distributor then redistributes the liquid to the underlying packing bed. Alternatively, combined collectors and distributors are used to collect and redistribute the exiting liquid.

The liquid collection and distribution devices that support the packing beds, as well as the liquid collector and distributors associated with the packing beds, occupy a portion of the height of the column which might otherwise be used for mass transfer or heat exchange purposes. In the design of new columns, additional column height may be provided to accommodate these components so that the desired mass transfer or heat exchange within the column can be achieved, but the additional height increases the materials cost for the column. In the case of a revamp of an existing column, the space occupied by these components limits the mass transfer or heat exchange that can be achieved within the column.

A need thus exists for improvements in the support of packing beds and the collection and redistribution of liquid between such beds.

SUMMARY OF THE INVENTION

In one embodiment, the present invention is directed to a liquid collection and distribution device installed in a column comprising an external shell and an internal region in which mass transfer and/or heat exchange are intended to occur. The device comprises a liquid collector extending across the internal region of the column, at least one framework extending across the internal region of the column and having opposed ends supported by the shell of the column, a liquid distributor underlying and supported by the framework; and an internal fluid passage formed within the framework. The liquid collector comprises a plurality of collection channels that extend longitudinally in parallel relationship to each other for collecting liquid descending within said internal region of the column. The collection channels have outlets for discharging the liquid collected in the collection channels into the internal fluid passage in the framework. The liquid is conveyed by the internal fluid passage downwardly to the liquid distributor, which then uniformly distributes the liquid to an underlying bed of packing material or other column internal. In addition to supporting the underlying liquid distributor, the framework underlies and supports the liquid collector. A bed of packing material or other column internal may be placed directly on the liquid collector and thereby supported by the framework.

In another embodiment, the invention is directed to a method for collecting and redistributing liquid using a liquid collection and distribution device installed in a column comprising an external shell and an internal region in which mass transfer and/or heat exchange occur. The method comprises the steps of collecting liquid descending in the internal region of the column in collection channels of a liquid collector extending across the internal region of the column; conveying the liquid collected in the collection channels to, and flowing the liquid downwardly through, an internal fluid passage formed in a framework extending across the internal region of the column; and delivering the liquid from the internal fluid passage in the framework to a liquid distributor underlying and supported by said framework. The framework has opposed ends supported by the shell of the column and is positioned in underlying and supporting relationship to the liquid collector. In this manner, the framework supports the liquid collector and the liquid distributor, and may also support an upper bed of packing material or other column internal placed on the liquid collector. The method includes partially mixing the liquid to improve its compositional uniformity in addition to its volumetric flow uniformity after it is collected from the upper bed of packing material or other column internal and before it is redistributed to a lower bed of packing material or other column internal.

DETAILED DESCRIPTION

Figure 1:
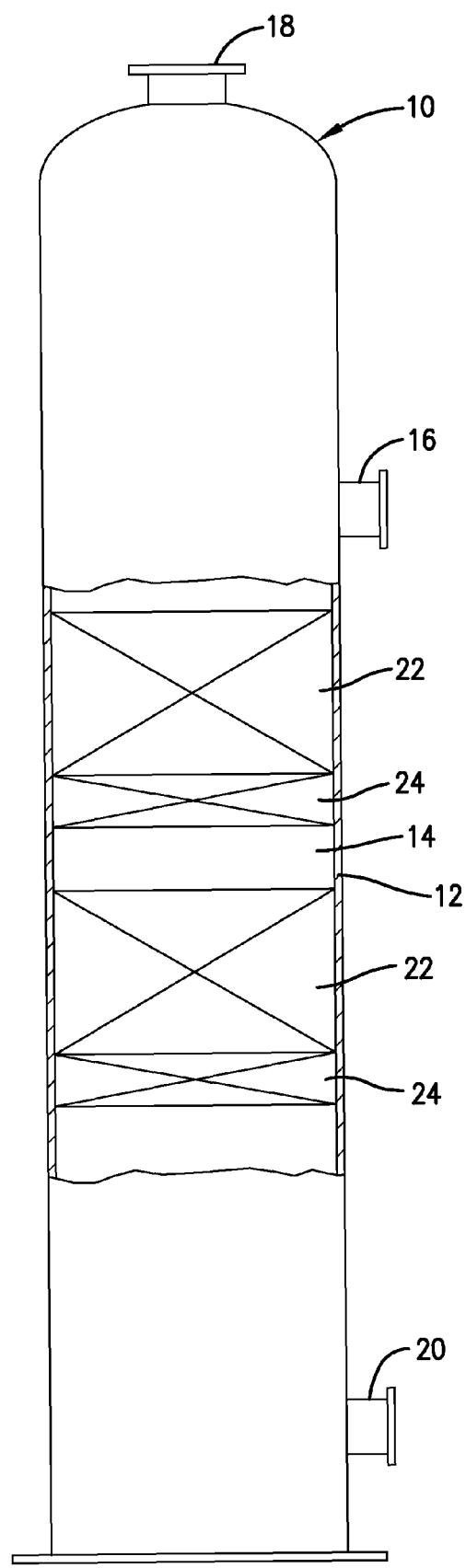
FIG. 1 is a side elevation view of a column in which mass and/or heat transfer are intended to occur and in which portions of the column shell are broken away to show schematically-depicted internal components.
Figure 2:
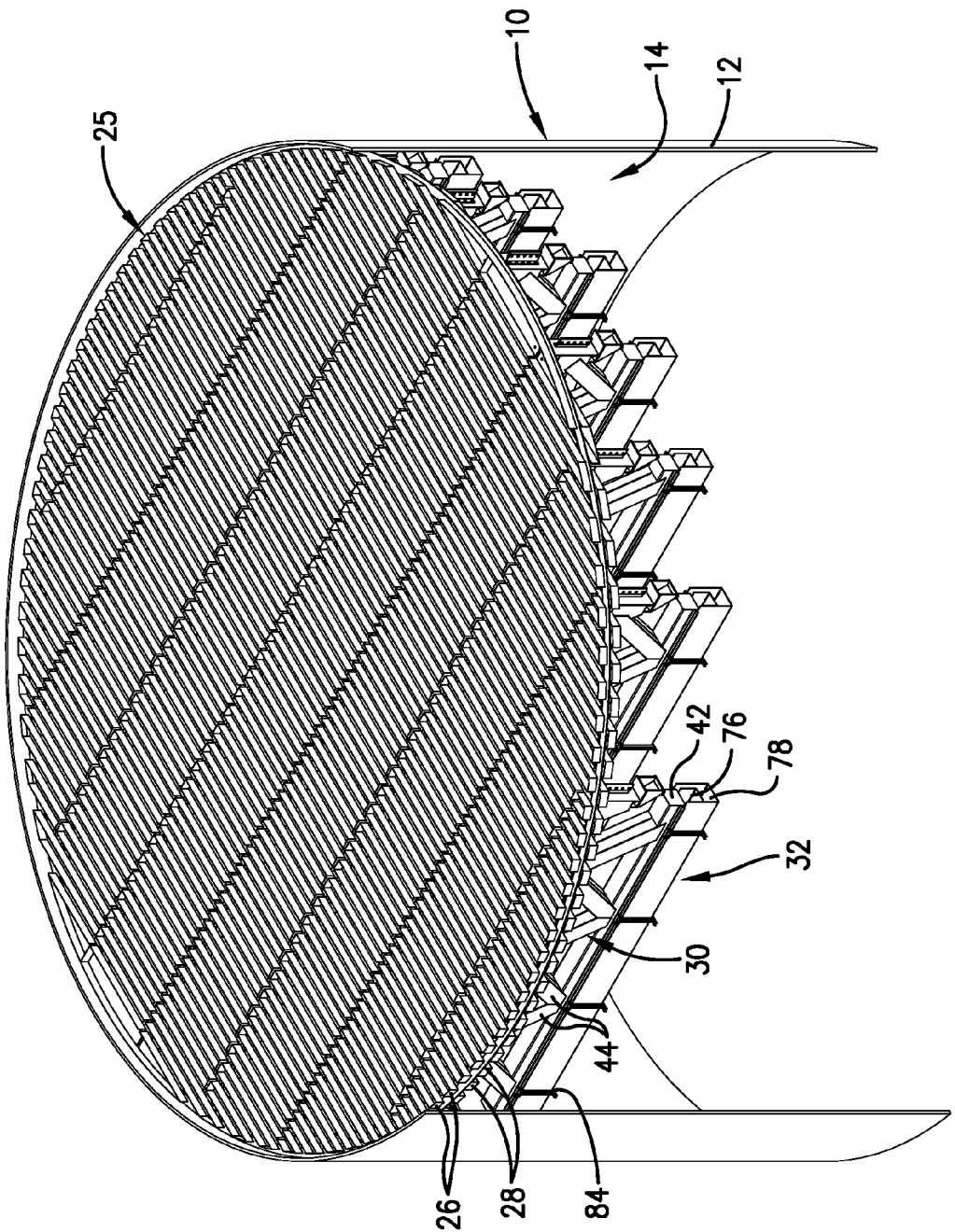
FIG. 2 is a fragmentary perspective view of the column of FIG. 1 and showing a liquid collection and distribution device constructed in accordance with one embodiment of the present invention.
Figure 3:
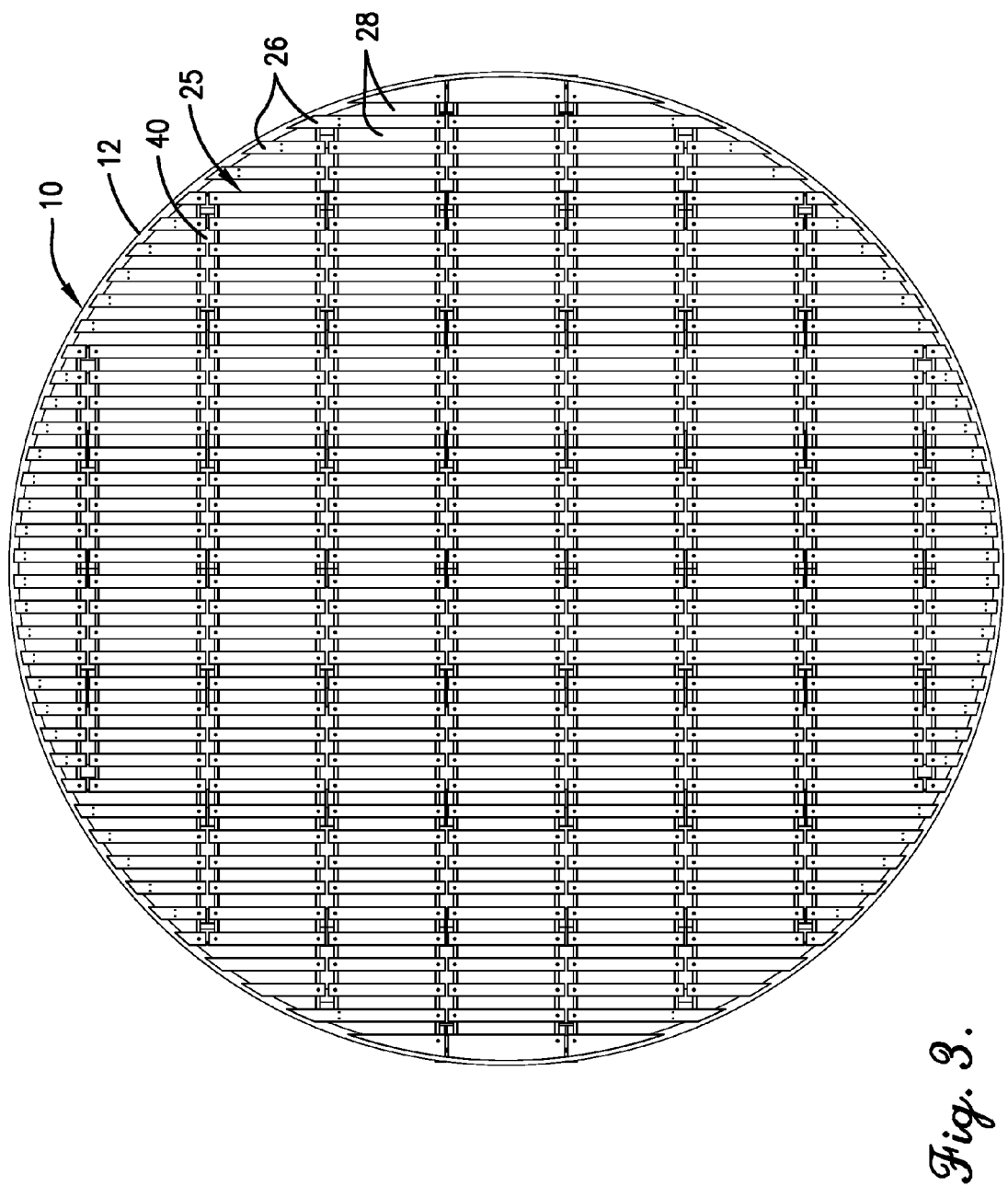
FIG. 3 is a top plan view of the column and liquid collection and distribution device shown in FIG. 2.
Figure 4:
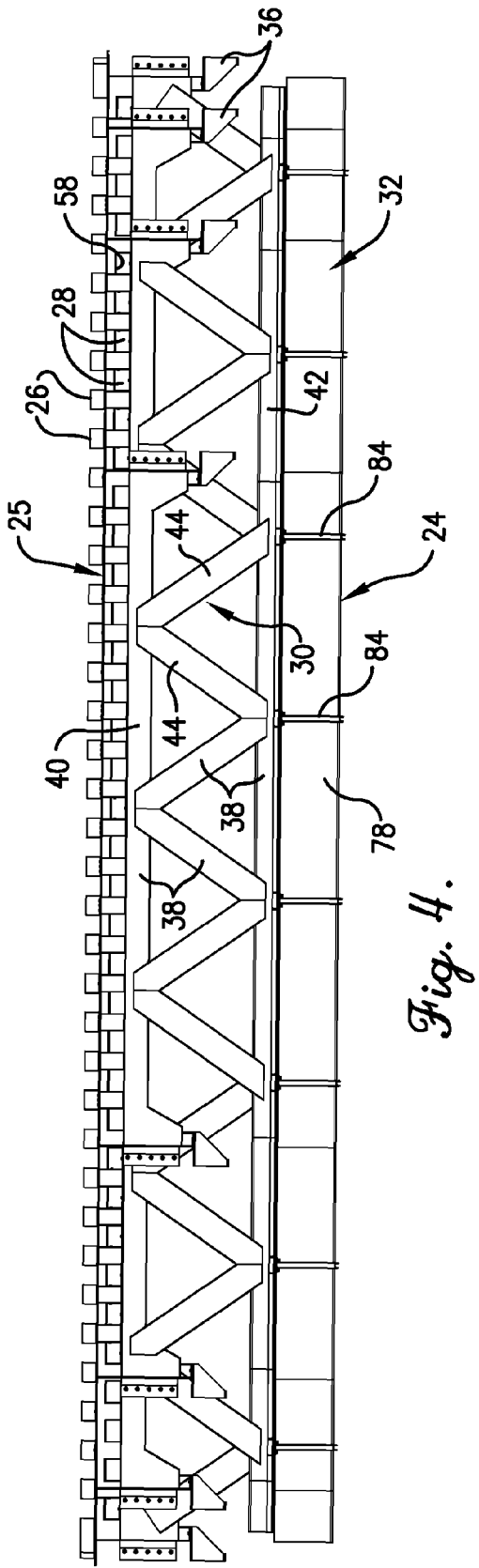
FIG. 4 is a side elevation view of the liquid collection and distribution device of FIG. 2.
Figure 5:
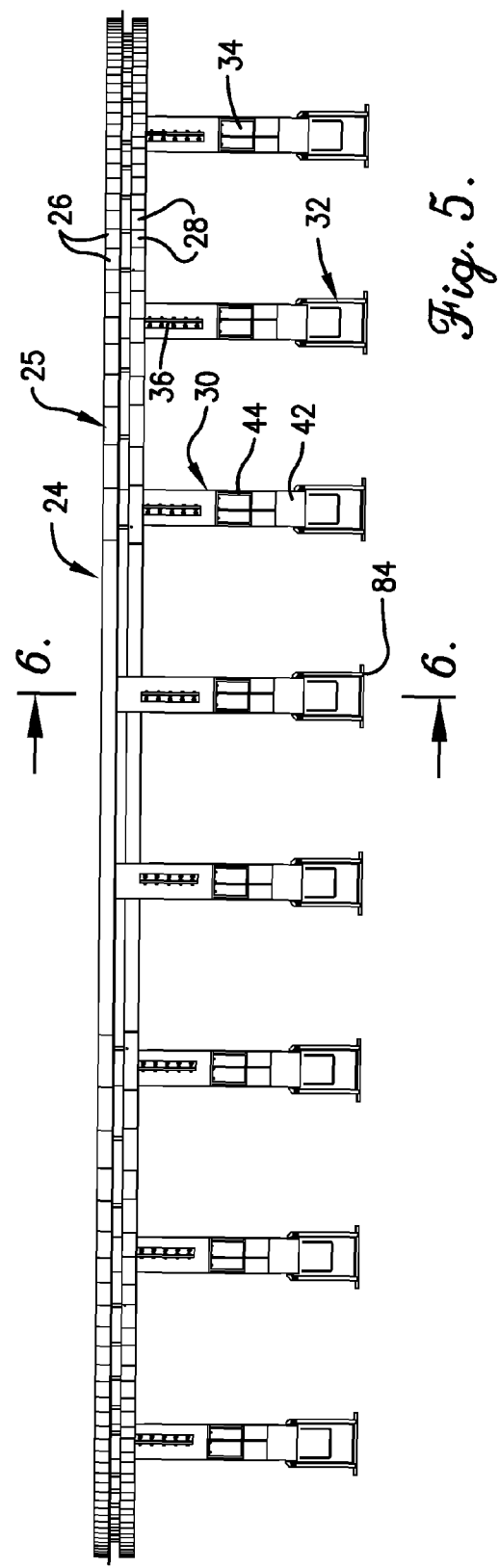
FIG. 5 is an end elevation view of the liquid collection and distribution device of FIG. 2.
Figure 6:
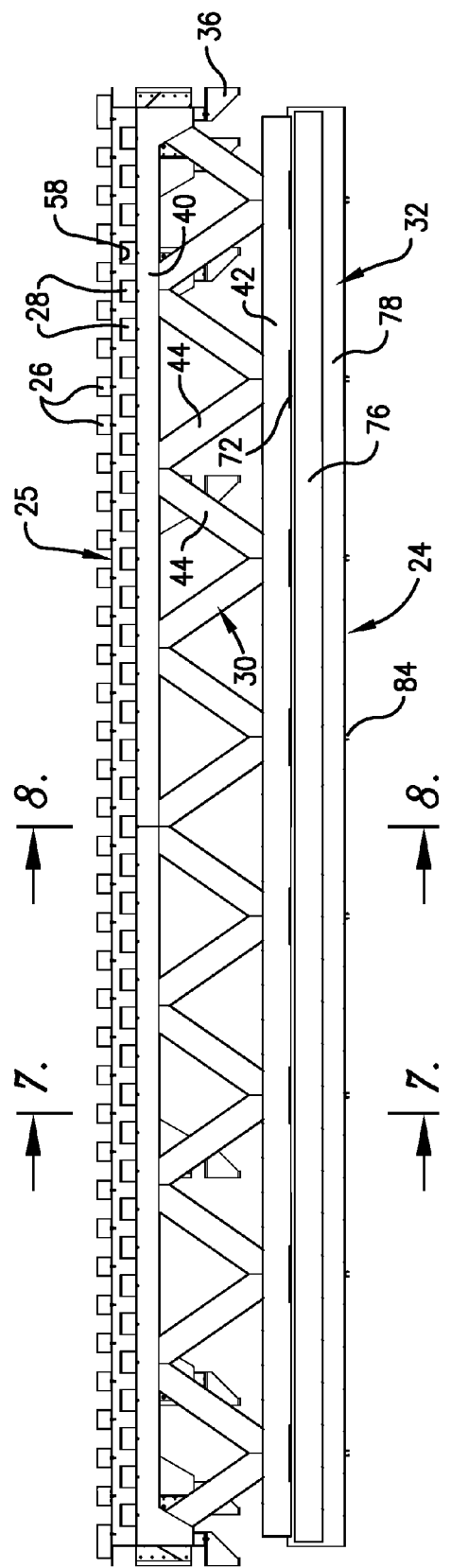
FIG. 6 is a side elevation view of the liquid collection and distribution device of FIG. 1 taken along line 6-6 of FIG. 5 in the direction of the arrows.

Turning now to the drawings in greater detail and initially to FIG. 1, a column suitable for use in processes in which mass transfer and/or heat exchange is intended to occur between countercurrent-flowing fluid streams is represented generally by the numeral 10. Column 10 includes an upright, external shell 12 that is generally cylindrical in configuration, although other configurations, including polygonal, are possible and are within the scope of the present invention. Shell 12 is of any suitable diameter and height and is constructed from one or more rigid materials that are desirably inert to, or are otherwise compatible with the fluids and conditions present during operation of the column 10.

Column 10 is of a type used for processing fluid streams, typically liquid and vapor streams, to obtain fractionation products and/or to otherwise cause mass transfer and/or heat exchange between the fluid streams. For example, column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur.

The shell 12 of the column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the column 10 through any number of feed lines 16 positioned at appropriate locations along the height of the column 10. One or more vapor streams can also be generated within the column 10 rather than being introduced into the column 10 through the feed lines 16. The column 10 will also typically include an overhead line 18 for removing a vapor product or byproduct and a bottom stream takeoff line 20 for removing a liquid product or byproduct from the column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

One or more regions or beds 22 of packing material are positioned within the open internal region 14 of the column 10. The packing material may be any of various forms of random packings and structured packings which are shown schematically in FIG. 1 because the exact form of the packing material is not important for purposes of the present invention. Each of the beds 22 of packing material preferably occupies the entire horizontal cross section of the open internal region 14 within the column 10. The beds 22 are of a preselected height based on the particular process application occurring within that portion of the column 10. The type of packing material within each bed 22 may be the same or different from the packing material in the other beds 22. Likewise, the height of each bed 22 may be the same or different from the height of the other beds 22.

In accordance with the present invention, each bed 22 of packing material is supported by a liquid collection and distribution device 24 shown schematically in FIG. 1. The liquid collection and distribution device 24 is in contact with the undersurface of the overlying bed 22 of packing material and is spaced above the upper surface of the underlying bed 22 of packing material by a preselected distance. The distance of separation between the liquid collection and distribution device 24 and the upper surface of the underlying bed 22 of packing material is selected based on the requirements of particular process applications.

One embodiment of the liquid collection and distribution device 24 depicted schematically in FIG. 1 is shown in more detail in FIGS. 2-10. Liquid collection and distribution device 24 comprises a liquid collector 25 comprising a plurality of upper collection channels 26 which lie in a common plane and extend in parallel relationship to each other at the top of the liquid collection and distribution device 24. The liquid collector 25 also includes a plurality of lower collection channels 28 that likewise extend in parallel relationship to each other and are positioned in a plane spaced a short distance below the plane of the upper collection channels 26. The upper and lower collection channels 26 and 28 occupy all or nearly all of the cross section of the open internal region 14 and are arranged so that the lower collection channels 28 are offset from the upper collection channels 26. The vertical spacing between the upper and lower collection channels 26 and 28 is selected to provide sufficient open flow volume to allow the desired volumetric flow of a vapor or gas stream upwardly through the liquid collector 25.

In one embodiment, each upper collection channel 26 is horizontally spaced from each adjacent upper collection channel 26 and each lower collection channel 28 is likewise horizontally spaced apart from each adjacent lower collection channel 28. When arranged in this manner, an upper collection channel 26 is positioned between and above each adjacent pair of lower collection channels 28 so that all of the liquid descending in the open internal region 14 of the column 10 is captured by either the upper collection channels 26 or the lower collection channels 28. The width of the upper collection channels 26 can be the same or different from the width of the lower collection channels 28. In one embodiment, the total horizontal surface area of the upper collection channels 26 is roughly equal to the total horizontal surface area of the lower collection channels 28.

Other arrangements of the upper and lower collection channels 26 and 28 are possible and are within the scope of the present invention. For example, in some or all regions, the upper and lower collection channels 26 and 28 can be sized and/or arranged so that the total horizontal surface area of the upper collection channels 26 is less than or greater than the total horizontal surface area of the lower collection channels 28. In other embodiments, the upper and/or lower collection channels 26 and 28 can be grouped so that two or more of the troughs 26 or 28 are positioned in side-side-side relationship and are spaced apart from similar groupings of troughs 26 or 28. In still other embodiments, the upper liquid collection channels 26 or the lower liquid collection channels 28 can be omitted so that the remaining upper or lower liquid collection channels 26 or 28 capture only a portion of the liquid descending through the liquid collector 25.

The liquid collection and distribution device 24 further comprises at least one framework 30 which underlies and supports the liquid collector 25 and a liquid distributor 32 which underlies and is supported by the framework 30. Notably, the liquid collection and distribution device 24 is constructed in a manner so that the framework 30 not only supports the liquid collector 25 and the liquid distributor 32, but also has one or more internal fluid passages 34 that receive the liquid from the liquid collector 25 and convey it to the liquid distributor 32.

Instead of only a single framework 30, the liquid collection and distribution device 24 may comprise a plurality of horizontally spaced-apart and parallel frameworks 30, with each framework 30 conveying a portion of the liquid from the liquid collector 25 to the liquid distributor 32. In some applications, each framework 30 conveys roughly the same volumetric flow rate of liquid as the other frameworks 30. In other applications, the frameworks 30 may convey different volumetric flow rates of liquid.

Each framework 30 extends linearly and is supported at its opposite ends by the column shell 12. Brackets 36 welded or otherwise fixed to the column shell 12 may be connected to each end of the framework 30 to support the framework 30 on the shell 12. Alternatively, a support ring (not shown) fixed to the column 12 may be used to support the opposite ends of the framework 30. Other means of support can be also used in place of or in addition to the brackets 36 and support ring.

Each of the frameworks 30 comprises frame members 38 which are interconnected in a manner to provide the framework 30 with sufficient strength and rigidity to support the loads exerted on the liquid collection and distribution device 24 by the liquid collector 25, liquid distributor 32, and fluid streams during operation of the column 10. The frame members 38 must also be partially or completely open internally to form the one or more internal fluid passages 34.

Figure 12:
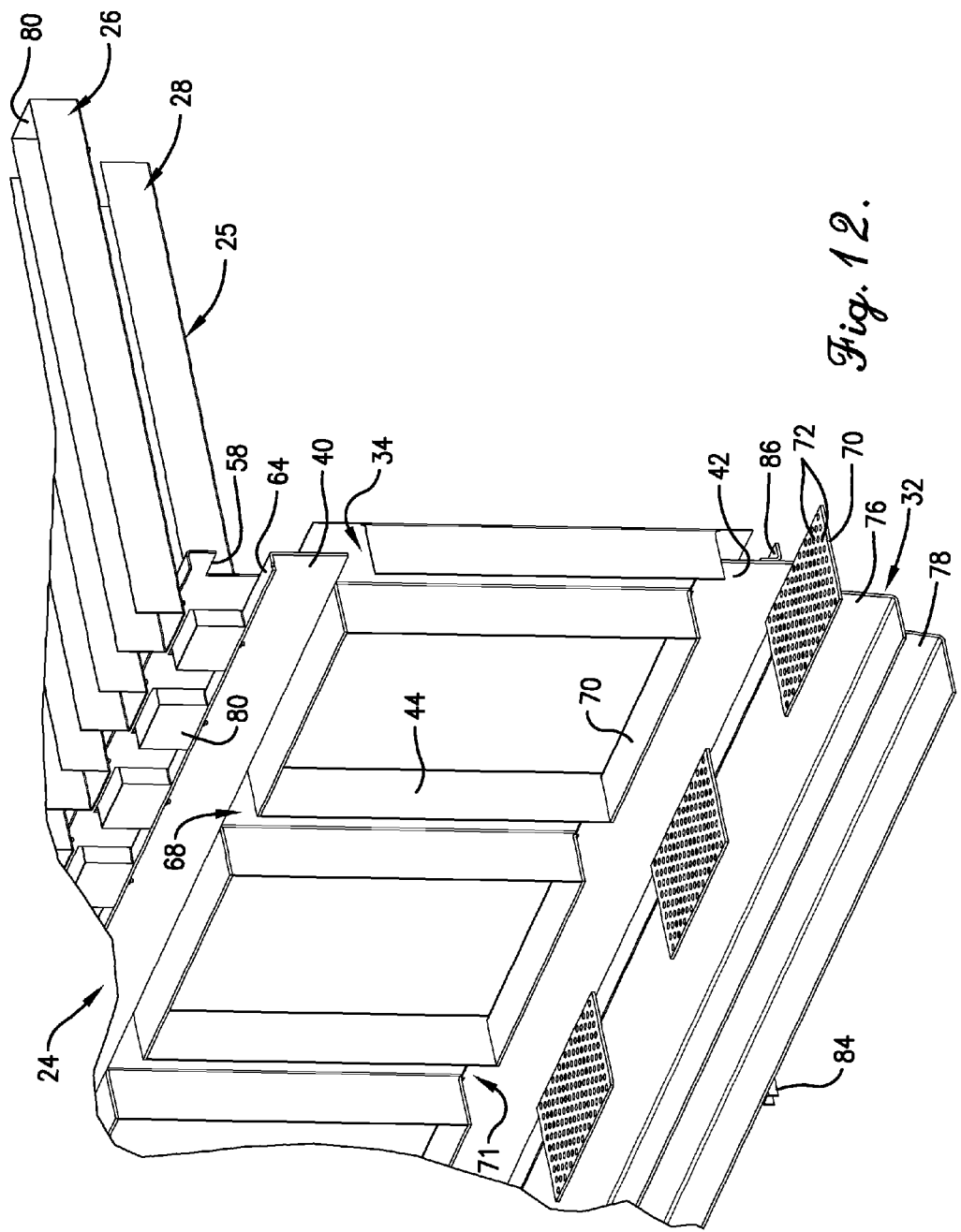
FIG. 12 is a fragmentary side elevation view similar to the view shown in FIGS. 10 and 11, but showing yet another embodiment of the liquid collection and distribution device of the present invention.

In the embodiment illustrated in FIGS. 2-10, the frame members 38 are formed into a triangular truss structure comprising a horizontally-extending upper truss chord 40, a horizontally-extending lower truss chord 42 spaced below the upper truss chord 40, and a plurality of inclined struts 44 which extend between the upper and lower truss chords 40 and 42. The struts 44 are arranged so that an upper end of each strut 44 abuts an upper end of one adjacent strut 44 and the lower end of each strut 44 abuts a lower end of another adjacent strut 44, thereby forming a triangular geometric pattern with the upper and lower truss chords 40 and 42. Other geometric arrangements of the struts 44 are possible and are within the scope of the present invention. As but one example, the struts 44 may extend perpendicularly to the upper and lower truss chords 40 and 42 to form a square or rectangular geometric pattern as shown in FIG. 12.

Figure 7:
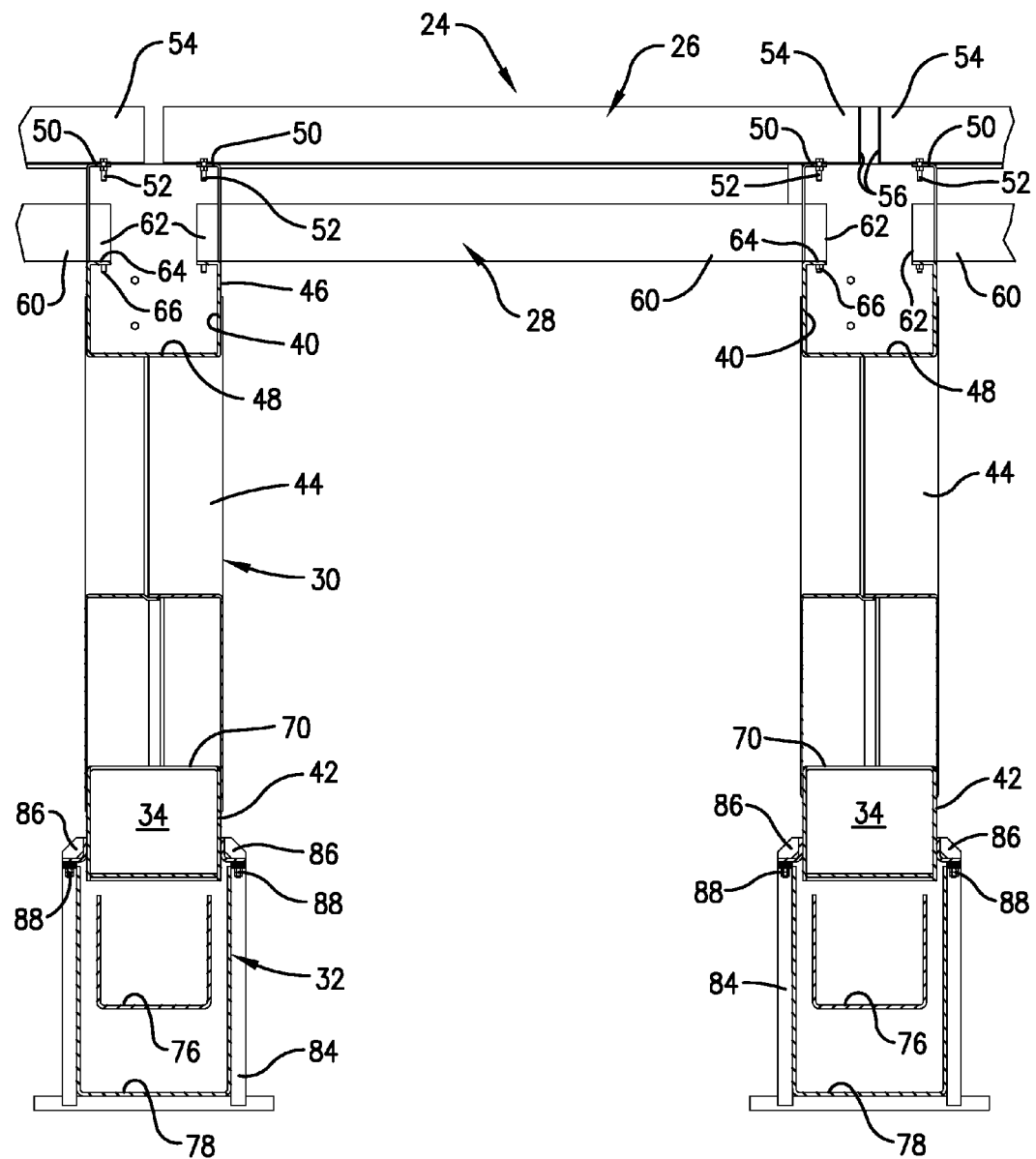
FIG. 7 is a fragmentary end elevation view of the liquid collection and distribution device of FIG. 1 taken along line 7-7 of FIG. 6 in the direction of the arrows and shown on an enlarged scale.
Figure 8:
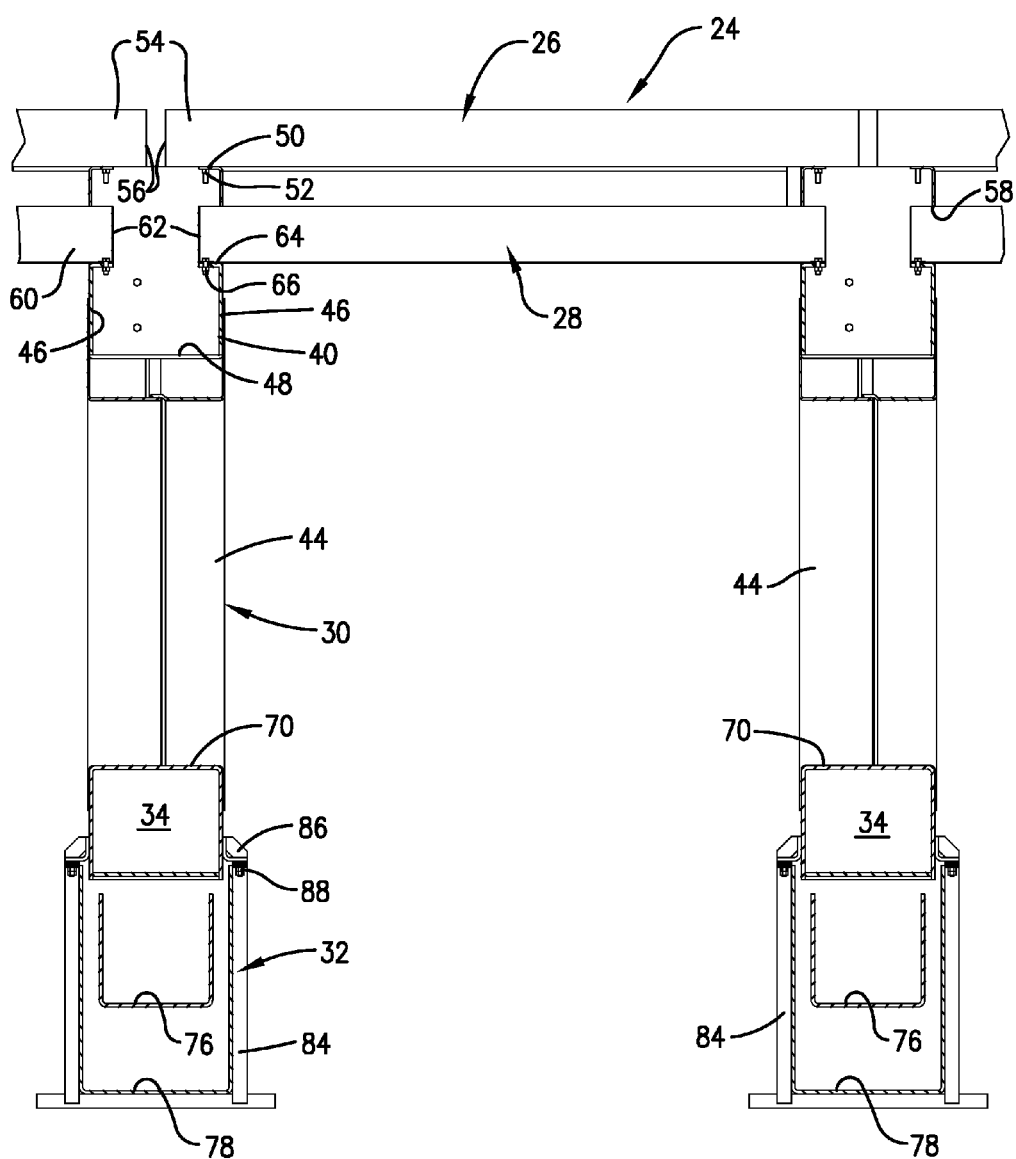
FIG. 8 is a fragmentary end elevation view of the liquid collection and distribution device of FIG. 2 taken along line 8-8 of FIG. 6 in the direction of the arrows.

Turning more specifically to FIGS. 7-8, the upper truss chord 40 is generally box-shaped in cross section and comprises side walls 46 joined by a floor 48. The upper truss chord 40 may be generally open at its top with inwardly or outwardly extending flanges 50 providing a support surface on which the upper collection channels 26 are positioned. The upper collection channels 26 may be fixed to the flanges 50 by nut and bolt assemblies 52 or by other suitable means. In the illustrated embodiment, each upper collection channel 26 is formed by linearly aligned trough segments 54, the ends of which are slightly spaced apart in the area overlying the top of the upper truss chord 40 to form outlets 56 through which liquid flows from the upper collection channel 26 into the upper truss chord 40. It will, of course, by appreciated that the outlet 56 can be formed in other ways. As one example, the upper collection channel 26 can be formed as a unitary member, rather than being formed by discrete trough segments 50, and the outlet 56 is formed as an opening (not shown) in one or more of the side walls and floor of the upper collection channel 26.

The lower collection channels 28 extend through openings 58 formed in the side walls 46 of the upper truss chord 40. Like the upper collection channels 26, the lower collection channels 28 may be formed from linearly-aligned and spaced-apart trough segments 60 which form outlets 62 in the spacing between the ends of the trough segments 60. Desirably, the spacing between the ends of the trough segments 60 in the lower collection channels 28 is greater than the spacing between the ends of the trough segments 54 in the upper collection channels 26 so that liquid exiting through the upper outlets 56 is not impeded by, and does not impede, liquid exiting from the lower outlets 62. Although the lower collection channels 28 are generally easier to install when formed from trough segments 60, they can each be formed as a unitary member with the outlets 62 formed in one or more of the side walls and floor of the lower collection channel 28. Inwardly or outwardly extending flanges 64 at the openings 58 and nut and bolt assemblies 66 can be used to support and secure the lower collection channels 28 in place.

Figure 11:
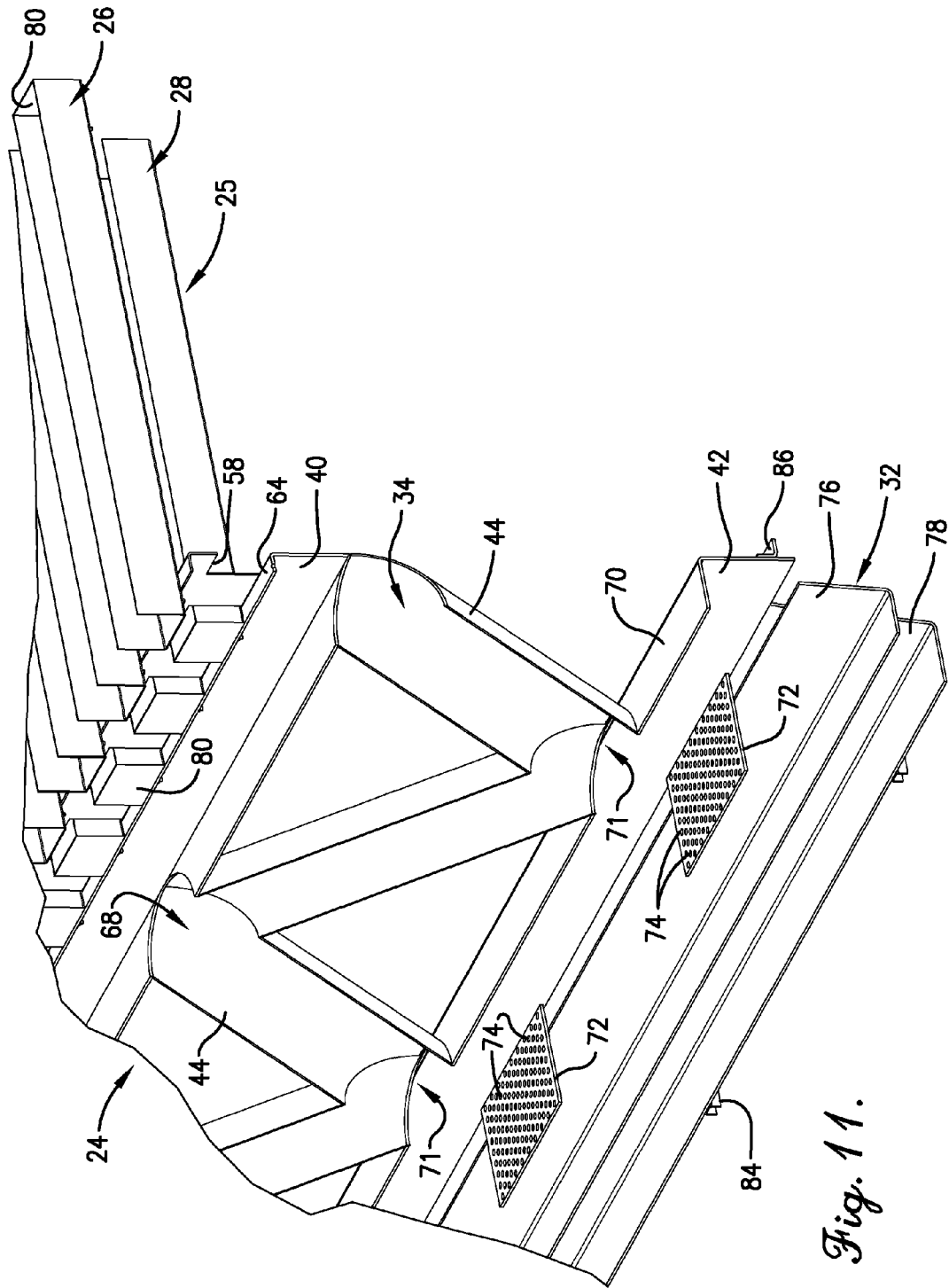
FIG. 11 is a fragmentary side elevation view similar to the view shown in FIG. 10, but showing another embodiment of the liquid collection and distribution device of the present invention.

The floor 48 of each upper truss chord 40 includes an opening 68 positioned at each intersection of the struts 44 with the upper truss chord 40. In this manner, liquid which enters the upper truss chord 40 from the outlets 56 and 62 of the upper and lower collection channels 26 and 28 is able to descend downwardly through the struts 44. The struts 44 can be square or rectangular in cross section as shown in the embodiments illustrated in FIGS. 2-10 and in FIG. 12 or round or oval in cross section as shown in FIG. 11.

A top 70 of each lower truss chord 42 likewise includes an opening 71 at the intersection of the struts 44 with the lower truss chord 42 so that liquid is able to flow from the struts 44 into the lower truss chord 42. The lower truss chords 42 can be open at their bottoms or a floor can be provided with suitable openings (not shown) to allow liquid to exit the lower truss chords 42. In the illustrated embodiments, each lower truss chord 42 is open at its bottom and a diffuser plate 72 extends between the side walls of the lower truss chord 42 at a location spaced below the opening 71 in the top of the lower truss chord 42 to receive and disrupt the downward momentum of liquid exiting the struts 44. The diffuser plate 72 includes a plurality of holes 74 which allow passage of a portion of the liquid through the diffuser plate 72, with the balance of the liquid being deflected by the diffuser plate 72 and passing downwardly off of the ends of the diffuser plate 72. The diffuser plate 72 may alternatively be formed as a unitary member extending the full length of the lower truss chord 42.

In one embodiment, the liquid distributor 32 includes a plurality of pre-distribution channels 76, each of which underlies and is aligned with an associated lower truss chord 42. The liquid distributor 32 additionally includes a parting box 78 associated with each pre-distribution channel 76. The pre-distribution channel 76 is positioned within and extends along the length of the parting box 78. The pre-distribution channel 76 may be supported in any suitable manner, such as by brackets (not shown) welded to the side walls of the parting box 78. The pre-distribution channel 76 is open at its top, or has openings (not shown) in its top, to receive the liquid exiting from the associated lower truss chord 42. The pre-distribution channel 76 serves to dissipate the kinetic energy of the liquid before it overflows the open top of the pre-distribution channel 76 and flows downwardly into the parting box 78. The parting boxes 78 then serve to meter the liquid to underlying distribution troughs (not shown) which deliver the liquid in a uniform distribution to the underlying bed 22 of packing material. Other types of liquid distributors 32 can be used in place of the illustrated trough-style liquid distributors 32 within the scope of the present invention. As but two examples, deck distributors and pipe arm liquid distributors can be used.

The parting boxes 78 are supported by support hangers 84 which are fixed to outwardly-extending flanges 86 on the lower truss chord 42 by nut and bolt assemblies 88 or by other means. In this manner, the liquid distributor 32 is supported by the frameworks 30 which also support the liquid collector 25 and the bed 22 of packing material.

In a method of collecting and redistributing liquid using the liquid collection and distribution device 24, the liquid collector 25 collects liquid descending from bed 22 of packing material in the open internal region 14 and conveys it to the internal fluid passages 34 in the frameworks 30. The liquid is shielded from the ascending vapor or gas stream as it flows through the internal fluid passages 34 and is delivered to the liquid distributor 32. The liquid is then redistributed in a more uniform flow by the liquid distributor 32 to an underlying bed 22 of packing material or other internal component of the column 10.

Figure 9:
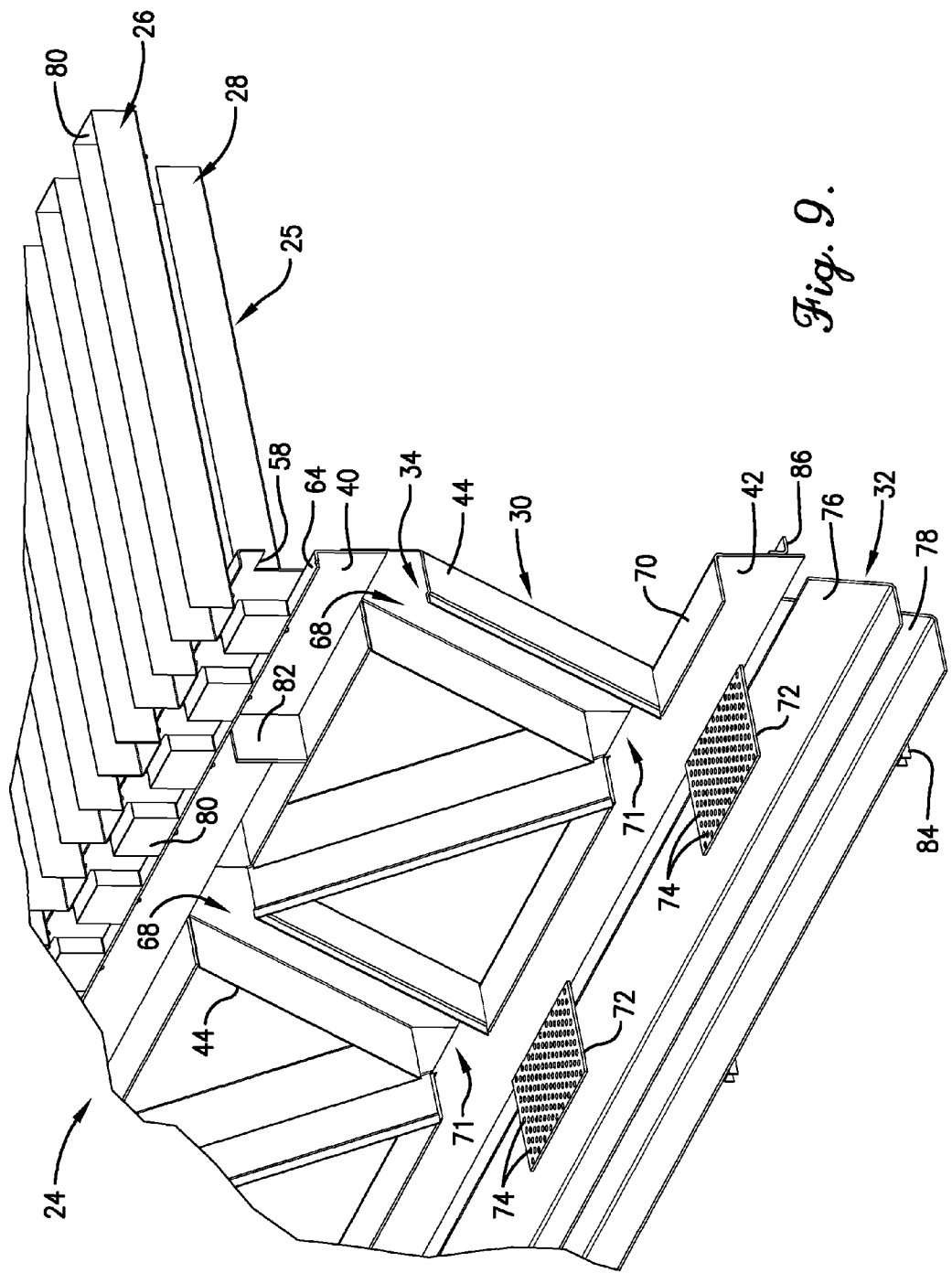
FIG. 9 is a fragmentary side perspective view of the liquid collection and distribution device of FIG. 2 with portions broken away to illustrate details of construction.
Figure 10:
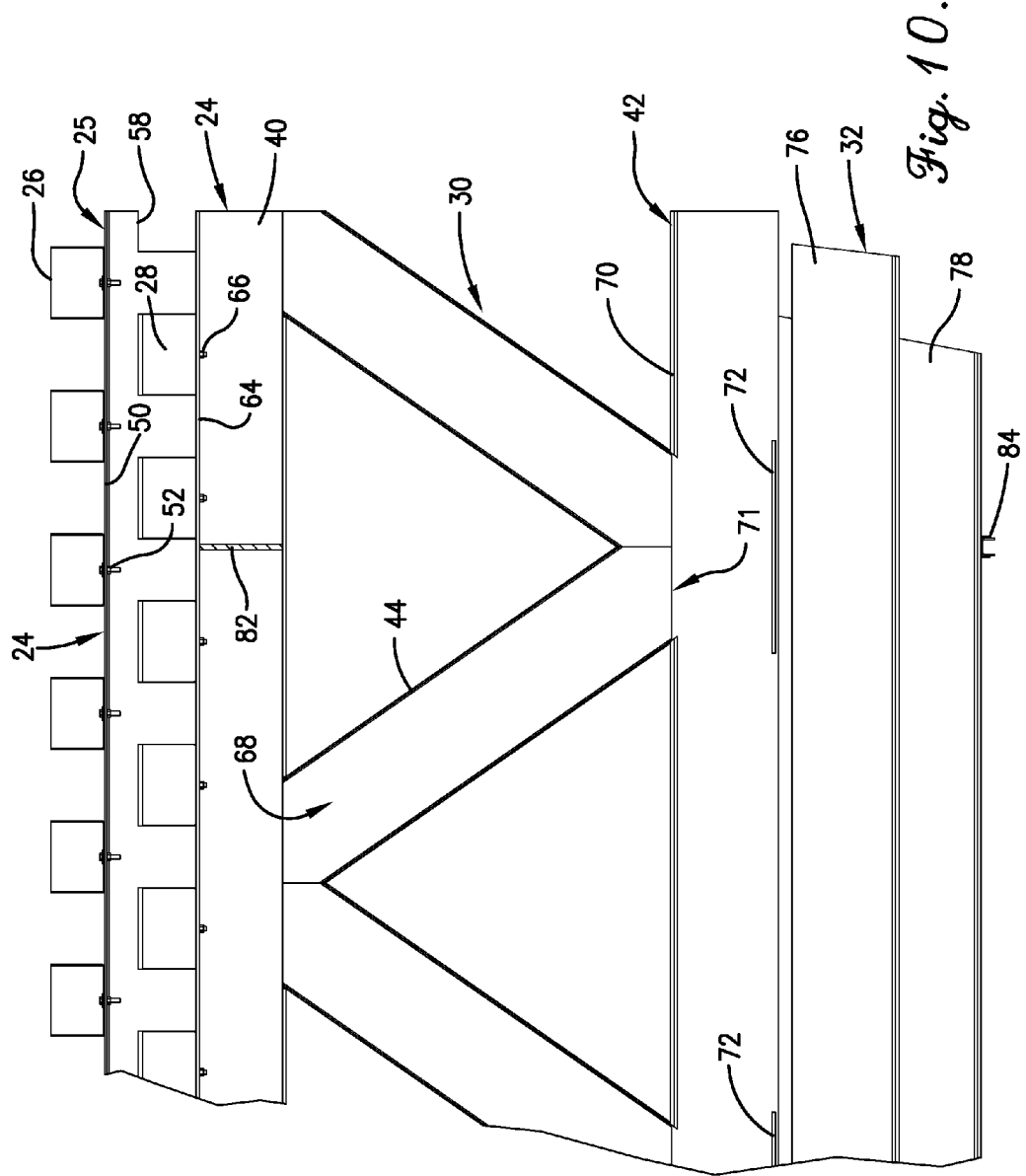
FIG. 10 is a fragmentary side elevation view of the portion of the liquid collection and distribution device shown in FIG. 9.

The flow of liquid through the components of the liquid collection and distribution device 24 can be regulated in a manner to correct for liquid flow or compositional maldistributions or to otherwise achieve mixing of fluid from different parts of the liquid collection and distribution device 24. For example, partition walls 80 can be positioned at one end or at intermediate locations along the upper and/or lower collection channels 26 and 28 to force more or all of the liquid in that collection channel to flow into the internal fluid passage 34 in one framework 30 rather than being equally split between the internal fluid passages 34 in two frameworks 30. As shown in FIG. 9, the partition walls 80 are positioned at one end of the trough segments 54 of the upper collection channels 26 and at the opposite end of the trough segments 60 of the lower collection channels 28. As one alternative, the partition walls 80 may be positioned at opposite ends of adjacent trough segments 54 of the upper collection channels 26 and at opposite ends of adjacent trough segments 60 of the lower collection channels 28. Other arrangements of the partition walls 80 are possible and are within the scope of the invention.

Partition walls 82 may likewise be positioned in the upper truss chords 40 to direct all or some of the liquid within a portion of the upper truss chord 40 to one opening 68 rather than being equally split between adjacent openings 68. In other applications, such as illustrated in FIG. 9, the partition walls 82 may be centrally positioned between adjacent openings 68 to compensate for upper truss chords 40 which are not precisely level. In such applications, the liquid would tend to preferentially flow toward the lower one of the adjacent openings 68, but the partition wall 82 forces equal amounts of liquid to flow into the adjacent openings 68.

It can thus be seen that the liquid collection and distribution device 24 allows the liquid collector 25, the bed 22 of packing material, and the liquid distributor 32 to be supported by the frameworks 30, thereby eliminating the need for separate support structures for each of these components. The liquid collection and distribution device 24 thus occupies less of the height of the column 10 in comparison to conventional support structures, in some instances saving up to 1 meter or more of column height at each location where the liquid collection and distribution devices 24 are installed. This reduction in height allows greater flexibility in initial column design or in revamping an existing column, leading to material savings and/or improved performance. The placement of the upper truss chord 42 immediately below the upper and lower liquid collection channels 26 and 28 allows those components to be securely fixed in position with limited opportunity for movement during operation of the column 10. Likewise, securing the liquid distributor 32 directly to the lower truss chord 42 facilitates leveling of the pre-distribution channel 76 and parting box 78 during installation and limits sagging or other deflection of those components when loaded with liquid during operation of the column 10. Moreover, the liquid collection and distribution device 24 achieves more desirable mixing of the collected liquid before it is redistributed, thereby providing a more uniform flow of liquid as well as a more uniform composition within that flow.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A liquid collection and distribution device installed in a column comprising an external shell and an internal region in which mass transfer and/or heat exchange are intended to occur, said device comprising:

a liquid collector extending across the internal region of the column and comprising a plurality of collection channels that extend longitudinally in parallel relationship to each other for collecting liquid descending within said internal region of the column, said collection channels having outlets for discharging liquid when collected in said collection channels;

at least one framework extending across the internal region of the column and having opposed ends supported by the shell of the column, said framework being positioned in underlying and supporting relationship to the liquid collector;

a liquid distributor underlying and supported by said framework; and an internal fluid passage formed within said framework and constructed for receiving liquid discharged from the outlets of the collection channels and conveying it to the liquid distributor.

2. The device of claim 1, wherein said plurality of collection channels comprises upper collection channels that extend longitudinally in parallel relationship to each other and lower collection channels that extend longitudinally in parallel relationship to each other, said lower collection channels being positioned in offset relationship to said upper collection channels.

3. The device of claim 2, wherein said upper collection channels lie in a first common horizontal plane and said lower collection channels lie in a second common horizontal plane spaced a preselected distance below said first common horizontal plane.

4. The device of claim 3, wherein said framework comprises interconnected frame members forming a truss structure and wherein said internal fluid passage is formed within said interconnected frame members.

5. The device of claim 4, wherein said truss structure comprises a horizontally extending upper truss chord, a horizontally-extending lower truss chord spaced below the upper truss chord, and a plurality of struts extending between the upper and lower truss chords.

6. The device of claim 5, wherein said struts are inclined and, with the upper and lower truss chords, form a triangular geometric pattern.

7. The device of claim 5, wherein said struts extend perpendicularly to the upper and lower truss chords and, with the upper and lower truss chords, form a square or rectangular geometric pattern.

8. The device of claim 5, including a plurality of said frameworks positioned in horizontally spaced-apart and parallel relationship, each of said frameworks having at least one of said internal fluid passages.

9. The device of claim 8, wherein at least some of said collection channels are positioned on the upper truss chords of said frameworks.

10. The device of claim 9, including a bed of packing material supported on said liquid collector.

11. A method for collecting and redistributing liquid using a liquid collection and distribution device installed in a column comprising an external shell and an internal region in which mass transfer and/or heat exchange occur, said method comprising the steps of:
collecting liquid descending in the internal region of the column in collection channels of a liquid collector extending across the internal region of the column, said collection channels extending in parallel and spaced-apart relationship to each other;
conveying the liquid collected in the collection channels to, and flowing the liquid downwardly through, an internal fluid passage formed in a framework extending across the internal region of the column, said framework having opposed ends supported by the shell of the column and being positioned in underlying and supporting relationship to the liquid collector; and
delivering the liquid from the internal fluid passage in the framework to a liquid distributor underlying and supported by said framework.

12. The method of claim 11, wherein said framework comprises interconnected frame members forming a truss structure and wherein said internal fluid passage is formed within said interconnected frame members.

13. The method of claim 12, wherein said step of collecting liquid comprises collecting liquid in upper collection channels that extend longitudinally in parallel relationship to each other and lower collection channels that extend longitudinally in parallel relationship to each other, said lower collection channels being positioned in offset relationship to said upper collection channels.

14. The method of claim 13, wherein said upper collection channels lie in a first common horizontal plane and said lower collection channels lie in a second common horizontal plane spaced a preselected distance below said first common horizontal plane.

15. The method of claim 14, wherein said truss structure comprises a horizontally extending upper truss chord, a horizontally-extending lower truss chord spaced below the upper truss chord, and a plurality of struts extending between the upper and lower truss chords.

16. The method of claim 15, wherein said struts are inclined and, with the upper and lower truss chords, form a triangular geometric pattern.

17. The method of claim 15, wherein said struts extend perpendicularly to the upper and lower truss chords and, with the upper and lower truss chords, form a square or rectangular geometric pattern.

18. The method of claim 15, including conveying the liquid in said collection channels to a plurality of said frameworks positioned in horizontally spaced-apart and parallel relationship, each of said frameworks having at least one of said internal fluid passages.

19. The method of claim 18, wherein at least some of said collection channels are positioned on the upper truss chords of said frameworks.

20. The method of claim 18, including the step of delivering the liquid from the liquid distributor to an underlying bed of packing material.

* * * * *